US00RE49074E

(19) United States
(12) Reissued Patent
Kim et al.

(10) Patent Number: US RE49,074 E
(45) Date of Reissued Patent: May 17, 2022

(54) SCROLL COMPRESSOR

(71) Applicant: LG ELECTRONICS INC., Seoul (KR)

(72) Inventors: Taekyoung Kim, Seoul (KR); Cheolhwan Kim, Seoul (KR); Byeongchul Lee, Seoul (KR)

(73) Assignee: LG ELECTRONICS INC., Seoul (KR)

(21) Appl. No.: 16/850,331

(22) Filed: Apr. 16, 2020

Related U.S. Patent Documents

Reissue of:
(64) Patent No.: 10,100,832
Issued: Oct. 16, 2018
Appl. No.: 14/731,589
Filed: Jun. 5, 2015

(30) Foreign Application Priority Data

Aug. 13, 2014 (KR) ..... 10-2014-0105228

(51) Int. Cl.
*F04C 29/02* (2006.01)
*F04C 23/00* (2006.01)
(Continued)

(52) U.S. Cl.
CPC ..... *F04C 29/02* (2013.01); *F01C 21/10* (2013.01); *F04C 18/0215* (2013.01);
(Continued)

(58) Field of Classification Search
CPC ..... F04C 29/026; F04C 29/028; F04C 29/02; F04C 18/0215; F04C 23/008; F01C 21/10
See application file for complete search history.

(56) References Cited

U.S. PATENT DOCUMENTS 4,702,683 A * 10/1987 Inaba ..... F01C 17/066 184/6.18
4,854,831 A 8/1989 Etemad
(Continued)

FOREIGN PATENT DOCUMENTS

JP 2003-003974 1/2003
JP 2013-137004 7/2013
(Continued)

OTHER PUBLICATIONS

Translation for JP 2013 137004 (Year: 2013).*
(Continued)

*Primary Examiner* — William C Doerrler
(74) *Attorney, Agent, or Firm* — Ked & Associates LLP

(57) ABSTRACT

A scroll compressor is provided that may include a casing; an electric motor drive having a stator fixed within the casing, and a rotor rotatably provided within the stator; a rotational shaft coupled to the rotor to rotate along with the rotor; a compression device disposed at a lower portion of the electric motor drive to receive a rotational force from the rotational shaft and compress a refrigerant; and an oil storage space located within the casing. A plurality of oil discharge paths to allow oil accumulated at an upper portion thereof to be discharged to the oil storage space may be formed on an outer circumferential surface of the compression device to be separated from each other, and an overall cross-sectional area of the plurality of oil discharge paths may be about 2 to about 12% of an inner diameter cross-sectional area of the casing brought into contact with or
(Continued)

separated from an outer circumferential surface of the compression device in the compression device.

19 Claims, 8 Drawing Sheets

(51) Int. Cl.
*F04C 18/02* (2006.01)
*F01C 21/10* (2006.01)

(52) U.S. Cl.
CPC ..... *F04C 23/008* (2013.01); *F04C 29/026* (2013.01); *F04C 29/028* (2013.01)

(56) References Cited

U.S. PATENT DOCUMENTS 5,421,709 A * 6/1995 Hill ..... F04C 29/02 184/6.16
5,449,279 A * 9/1995 Hill ..... F04C 18/023 418/55.5
6,386,840 B1 5/2002 Williams
7,914,267 B2 * 3/2011 Sato ..... F04C 18/0215 418/11
2002/0141862 A1 10/2002 McEwen
2006/0171831 A1 * 8/2006 Elson ..... F04C 23/008 418/55.6
2008/0273998 A1 11/2008 Negishi
2009/0238703 A1 9/2009 Jeong
2009/0238704 A1 9/2009 Sakamoto
2010/0021330 A1 * 1/2010 Haller ..... F04C 29/028 418/55.6
2013/0251543 A1 * 9/2013 Duppert ..... F04C 23/008 417/53
2014/0044572 A1 * 2/2014 Iitsuka ..... F04C 23/02 417/372
2014/0286807 A1 * 9/2014 Sekiya ..... F04C 29/128 418/55.1

FOREIGN PATENT DOCUMENTS

KR 10-1987-0001396 7/1987
KR 10-2003-0040897 5/2003
KR 10-2008-0036488 4/2008

OTHER PUBLICATIONS

U.S. Office Action issued in U.S. Appl. No. 14/731,589 dated Nov. 21, 2017.
U.S. Office Action dated Dec. 28, 2020 issued in U.S. Appl. No. 16/850,400.
Korean Notice of Allowance dated Jan. 27, 2021.

* cited by examiner

SCROLL COMPRESSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION(S)] *APPLICATIONS*

[The present] *This* application *is a Reissue Application of U.S. Pat. No. 10,100,832 issued Oct. 16, 2018* (*U.S. patent application Ser. No. 14/731,589 filed Jun. 5, 2015*), *which* claims priority to Korean Application No. 10-2014-0105228, filed in Korea on Aug. 13, 2014, [which is] *whose disclosures are* herein expressly incorporated by reference in [its] *their* entirety.

BACKGROUND

1. Field

A scroll compressor is disclosed herein.

2. Background

In general, a compressor is applicable to a vapor compression type refrigeration cycle (hereinafter, referred to as a "refrigeration cycle"), such as a refrigerator, or an air conditioner, for example. A compressor can be typically divided into a hermetic type compressor, in which an electric motor drive, which is a typical electromotor, and a compression device operated by the electric motor drive are provided together at an inner space of a sealed casing, and an open type compressor, in which the electric motor drive is additionally provided at an outside of the casing. The hermetic compressor is mostly used for household or commercial refrigeration devices.

Further, compressors can be divided into a reciprocating type, a rotary type, or a scroll type, for example, according to a type of compressing of a refrigerant. The reciprocating type compressor is a type that compresses a refrigerant while a piston drive portion linearly moves a piston. The rotary type compressor is a type that compresses a refrigerant using a rolling piston that performs an eccentric rotational movement in a compression space of the cylinder and a vane in contact with the rolling piston to partition the compression space of the cylinder into a suction chamber and a discharge chamber. The scroll compressor is a compressor in which a fixed scroll is fixed to an inner space of the hermetic container, and a plurality of compression chambers including of a suction chamber, an intermediate pressure chamber, and a discharge chamber is consecutively formed between a fixed wrap of the fixed scroll and an orbiting wrap of the orbiting wrap while the orbiting scroll engaged with the fixed scroll performs an orbiting movement. The scroll compressor is widely used for air conditioners, for example, to compress refrigerant due to an advantage of obtaining a relatively high compression ratio compared to the other types of compressors, as well as obtaining a stable torque as suction, compression, and discharge strokes are smoothly carried out.

Furthermore, a compressor can be divided into an upper compression type and a lower compression type according to a location of the electric motor drive and compression device. The upper compression type is a type in which the compression device is located at an upper side of the electric motor drive, and the lower compression type is a type in which the compression device is located at a lower side of the electric motor drive. In particular, in a case of the lower compression type, refrigerant discharged into an internal space of the casing moves to a discharge pipe located at an upper portion of a casing, while oil is recovered to an oil storage space, and thus, there is a concern that oil may be mixed with refrigerant to be discharged out of the compressor or pushed by a pressure of the refrigerant to stagnate at an upper side of the electric motor drive during the process. According to embodiments disclosed herein, a technique in which a passage to recover oil and a passage to discharge a refrigerant may be divided within the casing to reduce oil spill will be described using a high-pressure, lower compression type scroll compressor (hereinafter, referred to as a "lower compression type scroll compressor") as an example.

FIG. 1 is a cross-sectional view of a lower compression type scroll compressor according to the related art. As illustrated in the drawing, a lower compression type scroll compressor according to the related art may include an electric motor drive 2 provided in an internal space of a casing 1 and having a stator and a rotor, a compression unit or device 3 provided at a lower side of the electric motor drive 2, and a rotational shaft 5 that transmits a rotational force of the electric motor drive 2 to the compression device 3. A refrigerant discharge pipe 16 may be provided at an upper portion of the casing 1.

A passage (Pm) to guide oil separated from refrigerant at an upper side space of the electric motor drive 2 to be recovered to an oil storage space (V3) at an upper side space of the electric motor drive 2 at a lower side of the compression device 3 while at the same time guiding refrigerant discharged from the compression device 3 to move in a direction of the refrigerant discharge pipe 16 may be formed on an inner circumferential surface of the casing 1 and an outer circumferential surface of the electric motor drive 2 or an inner portion of the electric motor drive 2.

According to the foregoing lower compression type scroll compressor according to the related art, refrigerant and oil discharged from the compression device 3 may move to an upper side of the electric motor drive 2 through the passage (Pm) provided in the electric motor drive 2, and then, may be discharged to an outside of the compressor through the refrigerant discharge pipe 16. At the same time, oil separated from refrigerant between the electric motor drive 2 and the compression device 3 may move to the oil storage space (V3) through a passage (Pc) provided in the compression device 3, while oil separated from refrigerant at the upper side of the electric motor drive 2 may moves to the oil storage space (V3) at the lower side of the compressor through the passage (Pm) provided in the electric motor drive 2 and the passage (Pc) provided in the compression device 3.

Discharge refrigerant discharged into the internal space of the casing 1 from the compression device 3 may include oil. Recovery of oil contained in the discharged refrigerant is a key factor for system efficiency and compressor reliability.

For the upper compression type scroll compressor, the compression device may be located at an upper side of the casing, and thus, refrigerant coming out of the compression device may be almost directly discharged through the refrigerant discharge pipe, and has a short period of discharge time, thus resulting in a low oil separation efficiency. In contrast, for the lower compression type scroll compressor, the compression device 3 is located at the lower side of the casing 1, and thus, refrigerant coming out of the compression device 3 passes through other spaces to be discharged through the refrigerant discharge pipe 16, and thus, there is a sufficient time for oil to be separated therefrom before the discharge time, thus resulting in a relatively high oil separation efficiency.

Oil in the oil storage space (V3) may be supplied to the compression device 3, and oil remaining after lubricating the compression device 3 and oil mixed with compressed refrigerant may be accumulated on an upper surface of the compression device 3. As a result, the supply of oil to the compression device 3 may not be efficiently carried out in the oil storage space (V3) due to the shortage of oil, thereby causing damage to the compression device 3 or the rotational shaft 5.

Accordingly, the oil accumulated on an upper surface of the compression device 3 should be guided to the oil storage space (V3) at a bottom portion thereof in order to supply oil to the compression device 3. The recovery of oil to the oil storage space (V3) is very important to of the reliability of the compressor.

However, a wide oil discharge path should be provided to efficiently recover oil, but if the oil discharge path is too wide, then a fixed area for the casing of the main frame may decrease, deteriorating a fixing strength of the main frame. As a result, the oil discharge path should be formed to provide a sufficient fixed area.

BRIEF DESCRIPTION OF THE DRAWINGS

Embodiments will be described in detail with reference to the following drawings in which like reference numerals refer to like elements, and wherein.

DETAILED DESCRIPTION

Figure 1:
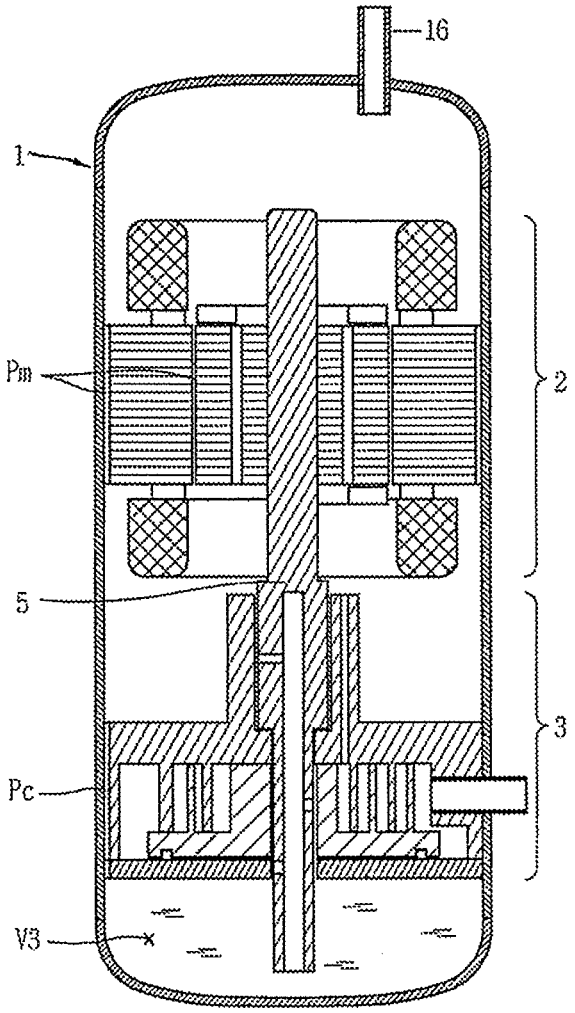
FIG. 1 RELATED ART
FIG. 1 is a cross-sectional view of a lower compression type scroll compressor according to the related art.

Hereinafter, a compressor according to an embodiment will be described in detail with reference to the accompanying drawings. Where possible, like reference numerals have been used to indicate like elements and repetitive disclosure has been omitted.

Figure 2:
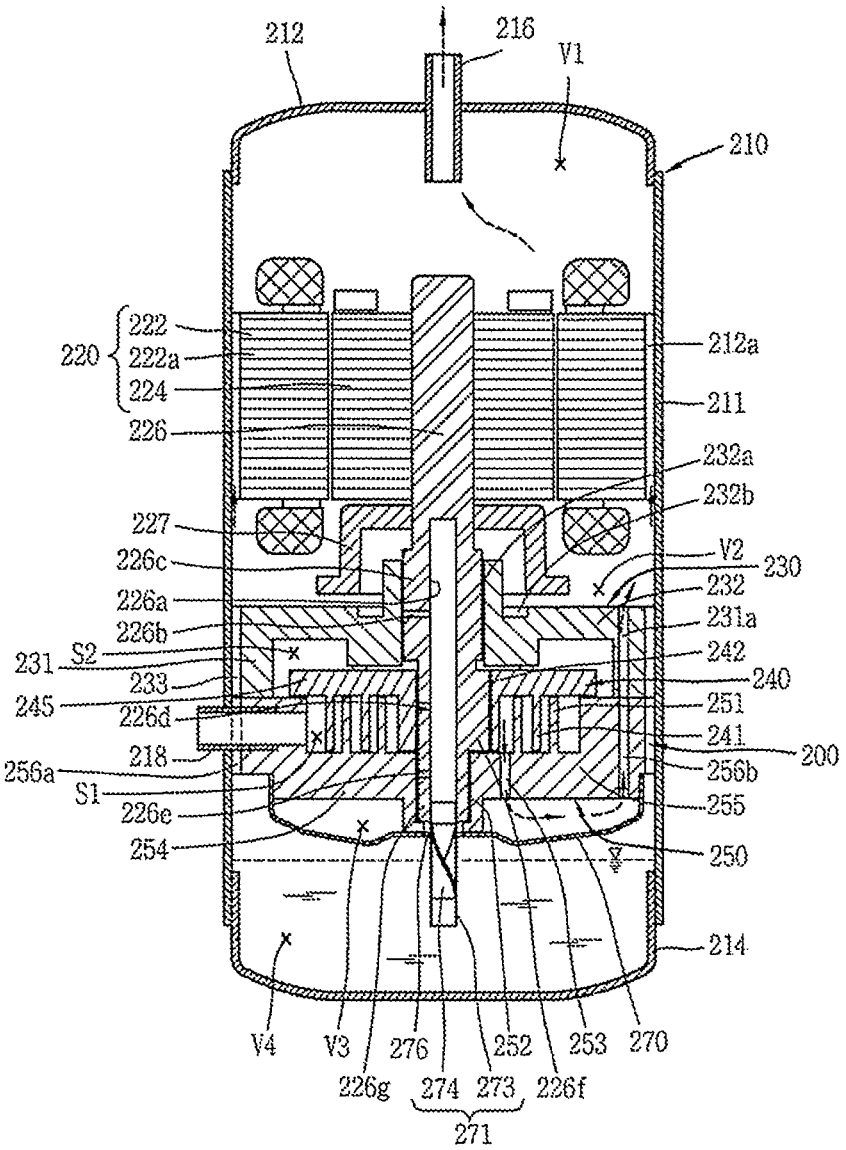
FIG. 2 is a cross-sectional view of a scroll compressor according to an embodiment.

FIG. 2 is a cross-sectional view of a scroll compressor according to an embodiment. As illustrated in FIG. 2, a scroll compressor according to an embodiment may include a casing 210 having an internal space, an electric motor drive 220 provided at an upper portion of the internal space, a compression unit or device 200 provided at a lower side of the electric motor drive 220, and a rotational shaft 226 configured to transfer a drive force from the electric motor drive 220 to the compression device 200. The internal space of the casing 210 may be partitioned into a first space (V1) at an upper side of the electric motor drive 220, a second space (V2) between the electric motor drive 220 and the compression device 200, a third space (V3) partitioned by a discharge cover 270 and an oil storage space (V4) at a lower side of the compression device 200.

The casing 210 may have a cylindrical shape, for example, and the casing 210 may include a cylindrical shell 211. An upper shell 212 and a lower shell 214 may be provided at an upper portion and a lower portion of the cylindrical shell 211, respectively. The upper shell 212 and the lower shell 214 may be coupled to the cylindrical shell 211 by welding, for example, to form the internal space.

A refrigerant discharge pipe 216 may be provided on the upper shell 212. The refrigerant discharge pipe 216 may be a path to discharge compressed refrigerant discharged into the second space (V2) from the compression device 200 to an outside. An oil separator (not shown) to separate oil mixed with the discharged refrigerant may be connected to the refrigerant discharge pipe 216.

A refrigerant suction pipe 218 which may be a path to receive refrigerant into the cylindrical shell 211 may be provided at a lateral surface of the cylindrical shell 211. The refrigerant suction pipe 218 may be provided along a lateral surface of a fixed scroll 250 to pass through a compression chamber of a plurality of compression chambers (S1).

The lower shell 214 may form an oil storage space (V4) that stores oil. The oil storage space (V4) may perform a function as an oil chamber to supply oil to the compression device 200 so as to efficiently operate the compressor.

The electric motor drive 220 may be provided at an inner upper portion of the casing 210. The electric motor drive 220 may be a motor, for example, and may include a stator 222 and a rotor 224.

The stator 222 may have a cylindrical shape, for example, and may be fixed to the casing 210. The stator 222 may include multiple slots (not shown), around which a coil 222a may be wound, formed on an inner circumferential surface thereof along a circumferential direction. A refrigerant passage groove 212a, which may be cut in a D-cut shape to allow refrigerant or oil discharged from the compression device 200 to pass therethrough, may be form on an outer circumferential surface thereof.

The rotor 224 may be coupled to an inner portion of the stator 222 to generate rotational power, and the rotational shaft 226 may be inserted into a center of the rotor 224 to perform a rotational movement along with the rotor 224. The rotational power generated by the rotor 224 may be transferred to the compression device 200 through the rotational shaft 226.

The compression device 200 may include a main frame 230, the fixed scroll 250, an orbiting scroll 240, and the discharge cover 270. The main frame 230 may be disposed at a lower side of the electric motor drive 220 to form an upper portion of the compression device 200.

The main frame 230 may include a frame end plate (hereinafter, referred to as a "first end plate") 232 having a substantially circular shape, a frame shaft receiving portion (hereinafter, referred to as a "first shaft receiving portion") 232a provided at a center of the first end plate 232, through which the rotational shaft 226 may pass, and a frame side wall (hereinafter, referred to as a "first side wall") 231 that protrudes in a downward direction at an outer circumferential portion of the first end plate 232.

An outer circumferential portion of the first side wall 231 may be brought into contact with an inner circumferential surface of the cylindrical shell 211, and a lower end portion thereof may be brought into contact with an upper end of a fixed scroll side wall 255, which will be described hereinbelow.

The first side wall 231 may be provided with a frame discharge hole (hereinafter, referred to as a "first discharge hole") 231a that passes through an inner portion of the first side wall 231 in an axial direction to form a refrigerant path. An inlet of the first discharge hole 231a may communicate with an outlet of a fixed scroll discharge hole 256b, which will be described hereinbelow, and an outlet of which may communicate with the second space (V2).

The first shaft receiving portion 232a may be formed to protrude from an upper surface of the first end plate 232 to a side of the electric motor drive 220. A first bearing may be formed on the first shaft receiving portion 232a to support a main bearing 226c of the rotational shaft 226, which will be disused hereinbelow, to pass therethrough.

An oil pocket 232b to collect oil discharged between the first shaft receiving portion 232a and the rotational shaft 226 may be formed on an upper surface of the first end plate 232, and an all recovery passage (not shown) forming a fifth passage to communicate the oil pocket 232b with an oil discharge path 233 may be formed at one side of the oil pocket 232b. The oil pocket 232b may be formed in an engraved manner on an upper surface of the first end plate 232, and may be formed in an annular shape along an outer circumferential surface of the first shaft receiving portion 232a.

The main bearing 226c of the rotational shaft 226 forming the first bearing may be rotatably inserted into the center of the main frame 230, and thus, the first shaft receiving portion 232a supported thereby may be formed to pass therethrough in an axial direction. Further, a back pressure chamber (S2) forming a space along with the fixed scroll 250 and the orbiting scroll 240 to support the orbiting scroll 240 by a pressure of the space may be formed on a bottom surface of the main frame 230.

As will be described hereinbelow, the main frame 230 may be coupled to the fixed scroll 250 to form a space in which the orbiting scroll 240 may be rotated in an orbital manner. It may have a structure surrounding the rotational shaft 226 to transfer rotational power to the compression device 200 through the rotational shaft 226. Oil discharge paths 233, 234, 235, 236, 237, 238 may be farmed on the main frame 230, which will be discussed hereinbelow.

The fixed scroll 250, which may be referred to as a "first scroll", may be coupled to a bottom surface of the main frame 230. The fixed scroll 250 may include a fixed scroll end plate (second end plate) 254 having a substantially circular shape, the fixed scroll partition wall (hereinafter, referred to as a "second partition wall") 255 that protrudes toward an upper side from an outer circumferential portion of the second end plate 254, a fixed wrap 251 that protrudes from an upper surface of the second end plate 254 and coupled with an orbiting wrap 241 of the orbiting scroll 240, which will be described hereinbelow, to form the compression chambers (S1), and a fixed scroll shaft receiving portion (hereinafter, referred to as a "second shaft receiving portion") 252 formed at a center of a rear surface of the second end plate 254, through which the rotational shaft 226 may pass.

A discharge port 253 to guide compressed refrigerant from the compression chambers (S1) to an internal space of the discharge cover 270 may be formed on the second end plate 254. A location of the discharge port 253 may be arbitrarily set by taking a required discharge pressure, for example, into consideration.

The discharge cover 270 that accommodates discharged refrigerant to guide it to the fixed scroll discharge hole 256b, which will be described hereinbelow, may be coupled to a bottom surface of the fixed scroll 250 as the discharge port 253 is formed toward the lower shell 214. The discharge cover 270 may be sealed and coupled to a bottom surface of the fixed scroll 250 to separate a discharge passage of refrigerant from the oil storage space (V4).

An internal space of the discharge cover 270 may be formed to accommodate the discharge port 253, as well as to accommodate an inlet of a fixed scroll groove 256a, which will be described hereinbelow. A through hole 276 may be formed on the discharge cover 270 to allow an oil feeder 271 coupled to a sub-bearing 226g of the rotational shaft 226, which will be described hereinbelow, to form a second bearing and submerged into the oil storage space (V4) of the casing 210 to pass therethrough.

An outer circumferential portion of the second partition wall 255 may be brought into contact with the inner circumferential surface of the cylindrical shell 211, and an upper end portion thereof may be brought into contact with a lower end portion of the first side wall 231. Further, the fixed scroll groove 256a may be formed in an engraved manner along an axial direction on an outer circumferential surface of the fixed scroll 250, both axial ends of which may be open to constitute the oil path of the fixed scroll 250, of the second partition wall 255. The fixed scroll groove 256a may be formed to correspond to the oil discharge path 233 of the main frame 230, and an inlet of the fixed scroll groove 256a may communicate with an outlet of the oil discharge path 233, and an outlet of the fixed scroll groove 256a may communicate with the oil storage space (V4). The fixed scroll groove 256a may form a space between the second partition wall 255 and the cylindrical shell 211.

The oil discharge path 233 and the fixed scroll groove 256a may communicate the second space (V2) with the fourth space (V4) to move oil from the second space (V2) to the fourth space (V4). Hereinafter, a passage formed by the oil discharge path 233 and the fixed scroll groove 256a may be referred to as a "third passage".

The fixed scroll discharge hole (hereinafter, referred to as a "second discharge hole") 256b that passes through an inner portion of the second partition wall 255 in an axial direction to form a refrigerant path along with the first discharge hole 231a may be provided on the second partition wall 255. The second discharge hole 256b may be formed to correspond to the first discharge hole 231a, and an inlet of the second discharge hole 256b may communicate with the internal space of the discharge cover 270, and an outlet of the second discharge hole 256b may communicate with an inlet of the first discharge hole 231a.

The second discharge hole 256b and the first discharge hole 231a may communicate the third space (V3) with the second space (V2) to guide refrigerant discharged from the compression chambers (S1) to the internal space of the discharge cover 270 to the second space (V2). Hereinafter, a passage formed by the second discharge hole 256b and the first discharge hole 231a may be referred to as a "fourth passage".

The refrigerant suction pipe 218 may be provided on the second partition wall 255 to communicate with a suction side of the compression chambers (S1). The refrigerant suction pipe 218 may be provided to be separated from the second discharge hole 256b.

The second shaft receiving portion 252 may protrude from a lower surface of the second end plate 254 to a side of the oil storage space. A second bearing may be provided on the second shaft receiving portion 252 to support the sub-bearing 226g, which will be described hereinbelow, of the rotational shaft 226 to be inserted therein.

A lower end of the second shaft receiving portion 252 may be bent toward a center of the rotational shaft 226 to support a lower end of the sub-bearing 226g of the rotational shaft 226 so as to form a thrust bearing surface.

The orbiting scroll 240 coupled to the rotational shaft 226, which may be referred to as a "second scroll" and which forms the plurality of compression chambers (S1) between the fixed scroll 250 and the orbiting scroll 240 while performing an orbiting movement may be provided between the main frame 230 and the fixed scroll 250. The orbiting scroll 240 may include an orbiting scroll end plate (hereinafter, referred to as a "third end plate") 245 having a substantially circular shape, the orbiting wrap 241 that protrudes from a lower surface of the third end plate 245 to be coupled with the fixed wrap 251, and the rotational shaft coupling portion 242 provided at a center of the third end plate 245 to be rotatably coupled to an eccentric portion 226f, which will be described hereinbelow, of the rotational shaft 226.

The orbiting scroll 240 may be supported by the fixed scroll 250 in such a manner that an outer circumferential portion of the third end plate 245 may be placed on an upper end portion of the second partition wall 255, and a lower end portion of the orbiting wrap 241 may be closely adhered to an upper surface of the second end plate 254.

An outer circumferential portion of the rotational shaft coupling portion 242 may be connected to the orbiting wrap 241 to perform a role in the forming of the compression chambers (S1) along with the fixed wrap 251 during the compression process. The fixed wrap 251 and the orbiting wrap 241 may be formed in an involute shape, but may also be formed in other various shapes.

The eccentric portion 226f, which will be described hereinbelow, of the rotational shaft 226 may be inserted into the rotational shaft coupling portion 242, such that the eccentric portion 226f may be coupled to the orbiting wrap 241 or the fixed wrap 251 to be overlapped therewith in a radial direction of the compressor. As a result, a repulsive force of refrigerant may be applied to the fixed wrap 251 and the orbiting wrap 241, and a compressive force may be applied between the rotational shaft coupling portion 242 and the eccentric portion 226f as a reaction force with respect to this during the compression process. As described above, when the eccentric portion 226f of the rotational shaft 226 passes through the third end plate 245 of the orbiting scroll 240 to be overlapped with the orbiting wrap 241 in the radial direction, the repulsive force and the compressive force of refrigerant may be cancelled out by each other while being applied on a same plane based on the third end plate 245. Because of this, tilting of the orbiting scroll 240 due to operation of the compressive force and the repulsive force may be prevented.

A lower portion of the rotational shaft 226 may be coupled to the compression device 200 to be supported in the radial direction while an upper portion thereof may be pushed into the center of the rotor 224 to be coupled thereto. As a result, the rotational shaft 226 may transfer the rotational force of the electric motor drive 220 to the orbiting scroll 240 of the compression device 200. Then, the orbiting scroll 240 eccentrically coupled to the rotational shaft 226 may perform an orbiting movement with respect to the fixed scroll 250.

The main bearing 226c may be formed at the lower portion of the rotational shaft 226 to be inserted into the first shaft receiving portion 232a of the main frame 230 and supported in the radial direction, and the sub-bearing 226g may be formed at a lower side of the main bearing 226c to be inserted into the second shaft receiving portion 252 of the fixed scroll 250 and supported in the radial direction. Further, the eccentric portion 226f may be formed between the main bearing 226c and sub-bearing 226g to be inserted into and coupled to the rotational shaft coupling portion 242 of the orbiting scroll 240. The main bearing 226c and the sub-bearing 226g may be formed on a coaxial line to have a same axial center, and the eccentric portion 226f may be eccentrically formed in a radial direction with respect to the main bearing 226c or the sub-bearing 226g. The sub-bearing 226g may be eccentrically formed with respect to the main bearing 226c.

It may be advantageous in allowing the rotational shaft 226 to pass through each of the shaft receiving portions 232a, 252 and the rotational shaft coupling portion 242 to be coupled thereto for an outer diameter of the eccentric portion 226f to be formed to be less than an outer diameter of the main bearing 226c and larger than an outer diameter of the sub-bearing 226g. However in a case in which the eccentric portion 226f is not integrated into the rotational shaft 226, but rather, is formed using an additional bearing, the rotational shaft 226 may be inserted thereinto and coupled thereto even when the outer diameter of the sub-bearing 226g is not formed to be less than the outer diameter of the eccentric portion 226f.

Moreover, an oil passage 226a to supply oil in the oil storage space (V4) to each bearing 226c, 226g and eccentric portion 226f may be formed within the rotational shaft 226, and oil holes 226b, 226d, 226e that passes from the oil passage to an outer circumferential surface thereof may be formed on the bearings and eccentric portion 226c, 226g, 226f of the rotational shaft 226.

Further, the oil feeder 271 to pump oil filled in the oil storage space may be coupled to a lower end of the rotational shaft 226, namely, a lower end of the sub-bearing 226g. The oil feeder 271 may include an oil supply pipe 273 inserted into and coupled to the oil passage 226a of the rotational shaft 226 and an oil suction member 274, such as a propeller, inserted into the oil supply pipe 273 to suck oil. The oil supply pipe 273 may pass through the through hole 276 of the discharge cover 270 to be submerged into the oil storage space (V4).

A balance weight 227 to suppress noise vibration may be coupled to the rotor 224 or the rotational shaft 226. The balance weight 227 may be provided between the electric motor drive 220 and the compression device 200, namely, in the second space (V2).

An operation process of a compressor according to an embodiment will be described hereinbelow.

When power is applied to the electric motor drive 220 to generate a rotational force, the rotational shaft 226 coupled to the rotor 224 of the electric motor drive 220 may rotate. Then, the orbiting scroll 240 coupled to the eccentric portion 226f of the rotating shaft 226 may sequentially move between the orbiting wrap 241 and the fixed wrap 251 while performing an orbiting movement to form the plurality of compression chambers (S1) including of a suction chamber, an intermediate pressure chamber, and a discharge chamber. The plurality of compression chambers (S1) may be sequentially formed in several steps while gradually decreasing a volume in a central direction.

Then, refrigerant supplied through the refrigerant suction pipe 218 from an outside of the casing 210 may directly flow into the plurality of compression chambers (S1), and the refrigerant may be compressed by the orbiting movement of the orbiting scroll 240 while moving in the direction of the discharge chamber of the plurality of compression chambers (S1), and then, may be discharged into the third space (V3) through the discharge port 253 of the fixed scroll 250.

Then, a series of processes by which compressed refrigerant discharged into the third space (V3) may be discharged into the internal space of the casing 210 through the first discharge hole 231a continuously formed through the fixed scroll 250 and the main frame 230, and then, may be discharged outside of the casing 210 through the refrigerant discharge pipe 216 may be repeated.

The process of storing oil in the oil storage space (V4) in a compressor according to an embodiment will be described hereinbelow.

A predetermined amount of oil may always be stored in the oil storage space (V4). The oil may be supplied to a sliding portion between the rotational shaft 226 and the rotational shaft coupling portion 242 through the oil passage 226a by a pressure difference between the internal space of the hermetic container, which is a high pressure portion, and the rotational shaft coupling portion 242 of the rotational shaft 226, which is a low pressure portion, and a weight of oil during rotation of the rotational shaft 226.

A portion of oil supplied to the sliding portion between the rotational shaft 226 and the rotational shaft coupling portion 242 may be supplied to a bearing surface between the fixed scroll 250 and the orbiting scroll 240, and any remaining oil after being used as a lubricant may be accumulated on the upper surface of the main frame 230.

Further, a portion of the oil may be supplied to the plurality of compression chambers (S1) to form an oil slick. Then, the oil may be compressed in the plurality of compression chambers (S1), and then, may be discharged into the second space (V2) along with refrigerant discharged through the discharge port 253 and the first discharge hole 231a. The oil discharged into the second space (V2) may be separated from refrigerant while flowing together with the refrigerant in the internal space of the casing 210, and the separated oil may be accumulated on the upper surface of the main frame 230.

The oil remaining after being used as a lubricant and the oil separated from refrigerant may be recovered to the oil storage space (V4) through the oil discharge path 233 of the main frame 230.

Taking this into consideration, according an embodiment, a suitable oil discharge path area may be determined to secure a fixing strength of the main frame 230 while sufficiently securing the oil discharge path 233.

Hereinafter, a structure for efficiently performing recovery of remaining oil after lubricating the compression device 200 and oil within compressed refrigerant at an inside of the casing 210 of the compressor will be described.

Figure 3:
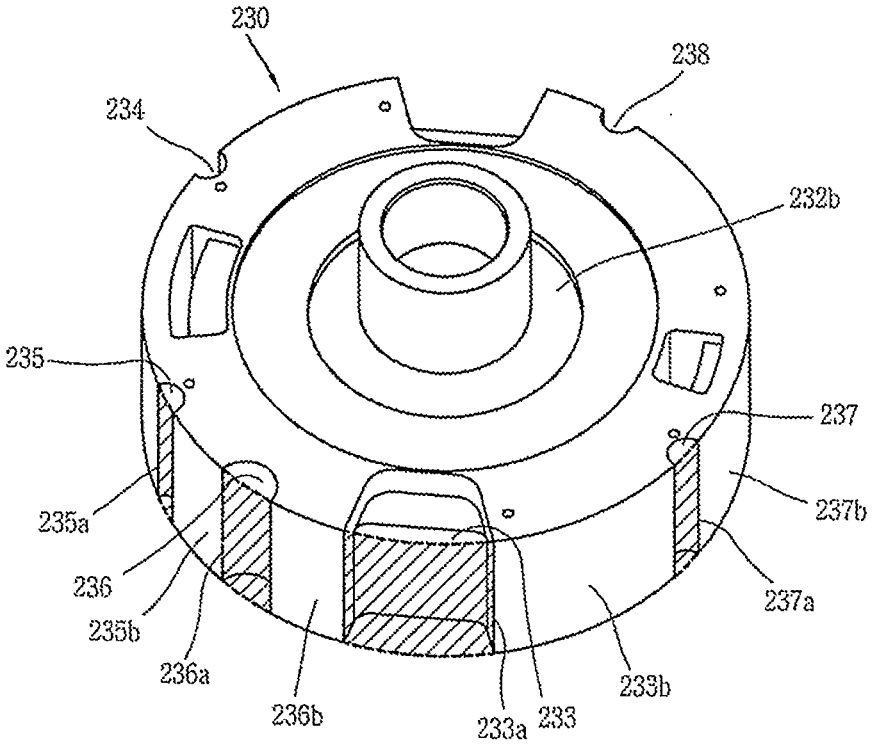
FIG. 3 is a perspective view a main frame of the scroll compressor of FIG. 2.
Figure 4:
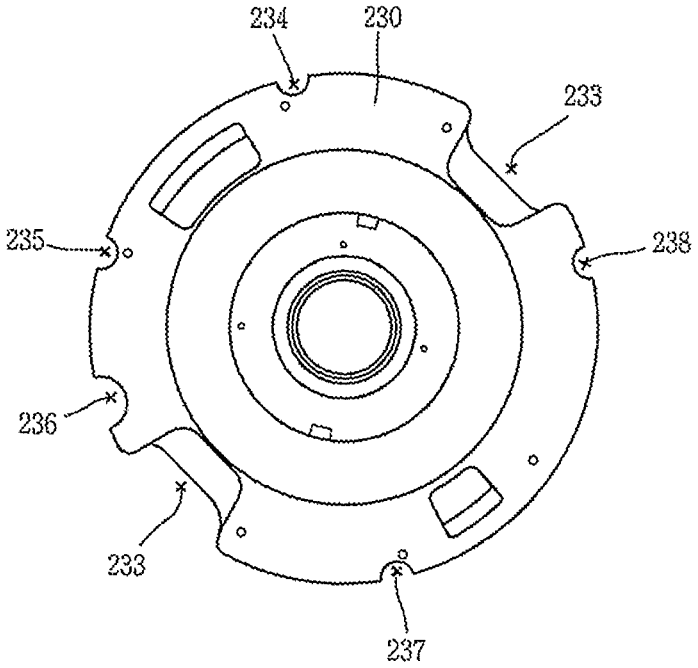
FIG. 4 is a plan view of the main frame of FIG. 3.

FIG. 3 is a perspective view of a main frame of the scroll compressor of FIG. 2. FIG. 4 is a plan view of the main frame of FIG. 3.

Referring to FIG. 3, oil discharge paths 233, 234, 235, 236, 237, 238, oil discharge path cross-sectional areas 233a, 235a, 236a, 237a, and mounting portions 233b, 235b, 236b, 237b are illustrated at an outer diameter of the main frame 230, and referring to FIG. 4, oil discharge paths 233, 234, 235, 236, 237, 238 are formed at predetermined intervals along an outer circumferential surface of the main frame 230.

Each oil discharge path 233, 234, 235, 236, 237, 238 may be a space in which oil contained in refrigerant discharged to an upper portion of the compression device 200 may be moved into the oil storage space (V4). Each oil discharge path 233, 234, 235, 236, 237, 238 may be formed on the main frame 230 or another component (for example, fixed scroll 250) when the other component forms an upper portion of the compression device 200. The oil discharge paths 233, 234, 235, 236, 237, 238 may be formed at predetermined intervals to be separated from each other along a circumference of the first side wall 231.

The oil discharge paths 233, 234, 235, 236, 237, 238 may each be formed in a hole shape adjacent to an upper outer circumferential surface of the first side wall 231 or recessed in a semi-circular shape on an outer circumferential surface of the first side wall 231 and extend from an upper portion to a lower portion of the first side wall 231. The oil discharge paths 233, 234, 235, 236, 237, 238 may each be formed adjacent to the outer circumferential surface to avoid interference with a bolt hole and prevent loss of oil due to interference between the oil discharge paths 233, 234, 235, 236, 237, 238 and the back pressure chamber (S2).

Each oil discharge path cross-sectional area 233a, 235a, 236a, 237a may be an area of a virtual curved surface formed to surround two vertical edges at which the respective oil discharge path intersects the outer circumferential surface of the main frame 230 and two edges formed by extending the two edges in an arcuate direction of the main frame 230, and facing the oil discharge path and the inner circumferential surface of the casing 210.

Further, the mounting portions 233b, 235b, 236b, 237b formed between the plurality of oil discharge paths 233, 234, 235, 236, 237, 238 and coupled to the inner circumferential surface of the casing 210 may be further formed on the main frame 230.

The entire cross-sectional area 233a, 235a, 236a, 237a of the oil discharge paths 233, 234, 235, 236, 237, 238 formed on the main frame 230 forming an upper portion of the compression device 200 according to an embodiment may be about 2 to about 12% of an inner diameter cross-sectional area of the casing 210 in contact with the main frame 230. The cross-sectional area of the inner diameter of the casing 210 in contact with the main frame 230 may be a sum of the oil discharge path cross-sectional areas 233a, 235a, 236a, 237a and an area of the mounting portions 233b, 235b, 236b, 237b.

Each of the mounting portions 233b, 235b, 236b, 237b may have an area larger than at least one of the oil discharge paths cross-sectional areas 233a, 235a, 236a, 237a formed at both adjoining sides thereof to allow the main frame 230 to be supported by and fixed and combined with the casing 210 without being released therefrom.

The oil discharge paths 233, 234, 235, 236, 237, 238 may be formed as described above, and oil may move along the oil discharge paths 233, 234, 235, 236, 237, 238 to be accumulated in the oil storage space (V4).

Figure 5:
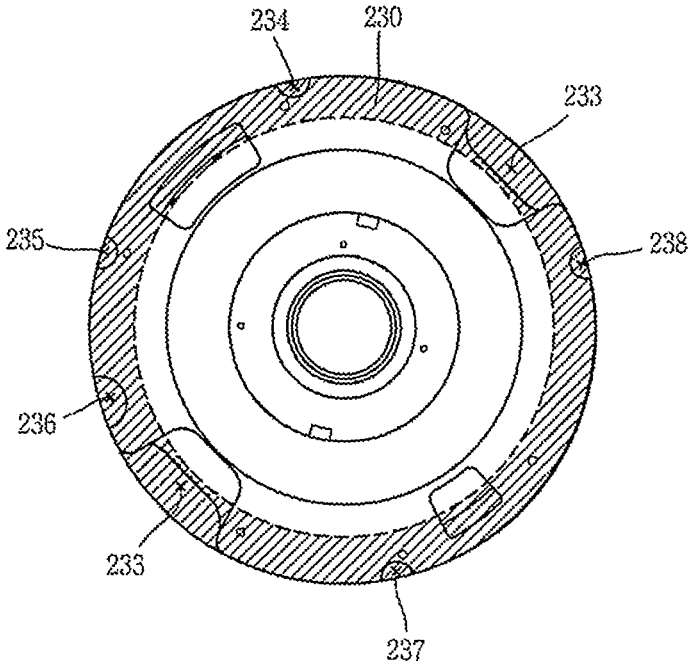
FIG. 5 is a conceptual view illustrating an area in which an oil discharge path may be formed on the main frame of FIG. 4.

FIG. 5 is a conceptual view illustrating an area in which an oil discharge path may be formed on the main frame of FIG. 4. Referring to FIG. 5, each oil discharge path 233, 234, 235, 236, 237, 238 according to an embodiment may be formed within a region offset by about 11 to about 13% of the compression device cross-sectional area in a central direction from the outer circumferential surface of the main frame 230 to avoid interference with a bolt hole and prevent loss of oil according to interference between the oil discharge paths 233, 234, 235, 236, 237, 238 and the back pressure chamber (S2), and a most optimal offset value may be about 12%.

A region offset by about 11 to about 13% of the compression device cross-sectional area in a central direction from the outer circumferential surface of the main frame 230 denotes a region in which when one circle that intersects the outer diameter based on a plan view of the main frame 230 and another circle which is concentric to the one circle are illustrated, the area of a region between the two circles is formed to be about 11 to about 13% of the area of the one circle that intersects the outer diameter.

Figure 6:
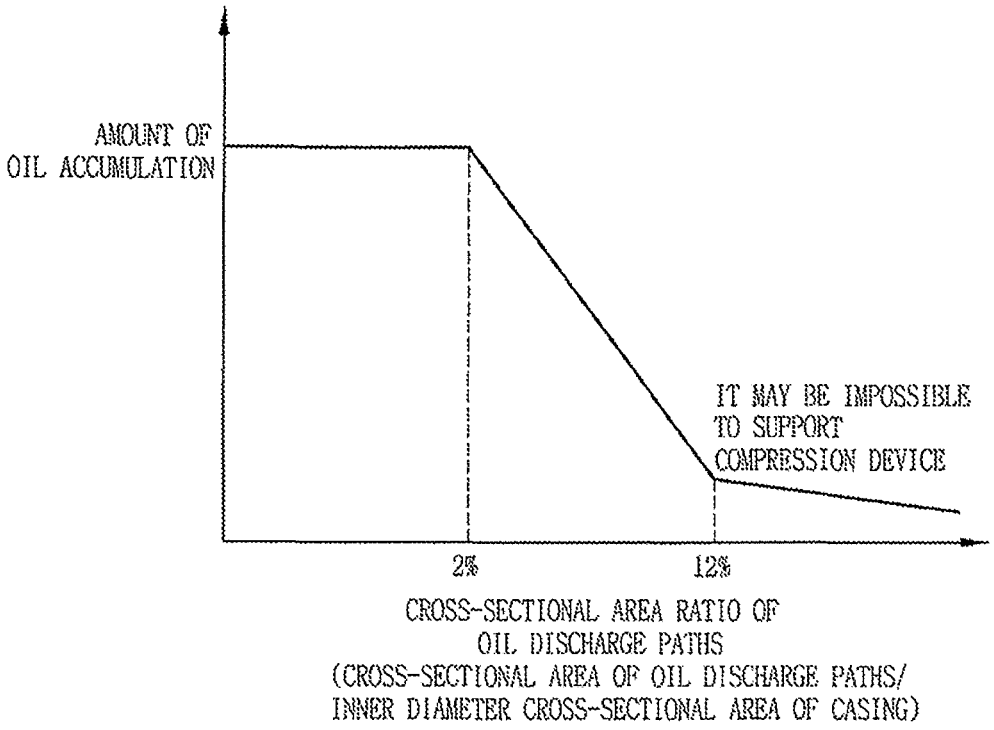
FIG. 6 is a graph illustrating an amount of oil accumulation versus an area of oil discharge path according to embodiments.

FIG. 6 is a graph illustrating an amount of oil accumulation versus an area of oil discharge path according to embodiments. Referring to FIG. 6, when the entire cross-sectional area of the oil discharge paths 233, 234, 235, 236, 237, 238 is less than about 2% compared to the inner diameter cross-sectional area of the casing 210, oil may be stagnant, thereby deteriorating performance of the compressor. Further, when the entire cross-sectional area of the oil discharge paths 233, 234, 235, 236, 237, 238 is greater than about 12% compared to the inner diameter cross-sectional area of the casing 210, it may be impossible to support the compression device 200.

Figure 7:
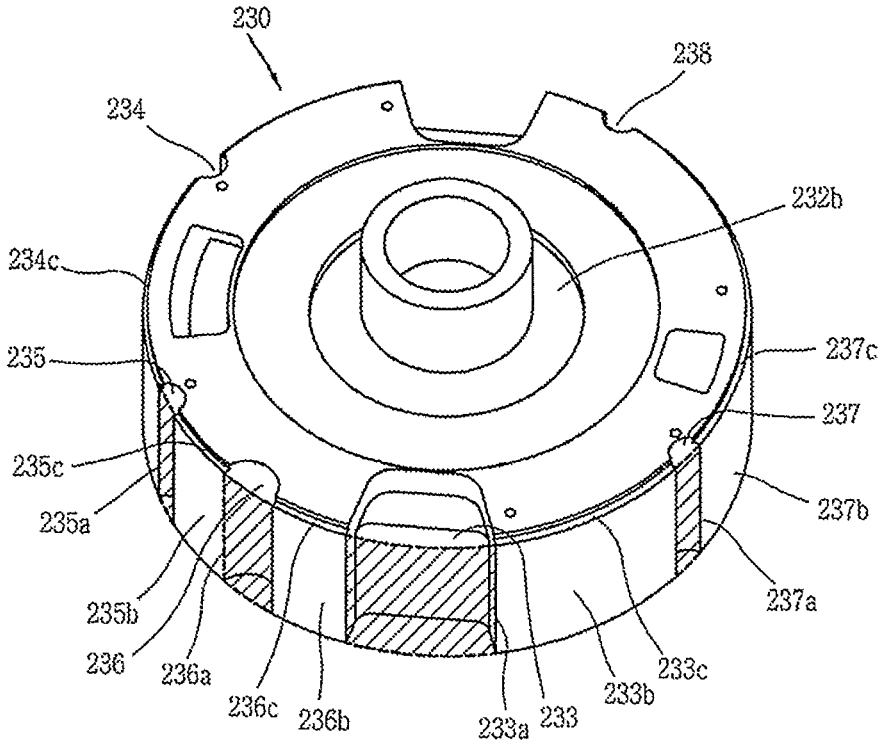
FIG. 7 is a perspective view of a main frame according to another embodiment.

FIG. 7 is a perspective view of a main frame according to another embodiment. Referring to FIG. 7, a plurality of first passage grooves 233c, 234c, 235c, 236c, 237c may be further formed on the main frame 230 in addition to the oil discharge paths 233, 234, 235, 236, 237, 238. Each first passage groove 233c, 234c, 235c, 236c, 237c may be a groove to allow oil accumulated on the upper surface of the main frame 230 to flow through the respective oil discharge path 233, 234, 235, 236, 237, 238.

Each first passage groove 233c, 234c, 235c, 236c, 237c may be formed at an upper edge of the outer circumferential surface of the main frame 230 to connect between the oil discharge paths 233, 234, 235, 236, 237, 238. The first passage grooves 233c, 234c, 235c, 236c, 237c may be formed in various shapes, such as being rounded at each edge, including a smooth curved surface or inclined surface therein, or changing a width of the groove, for example, to efficiently flow oil.

Figure 8:
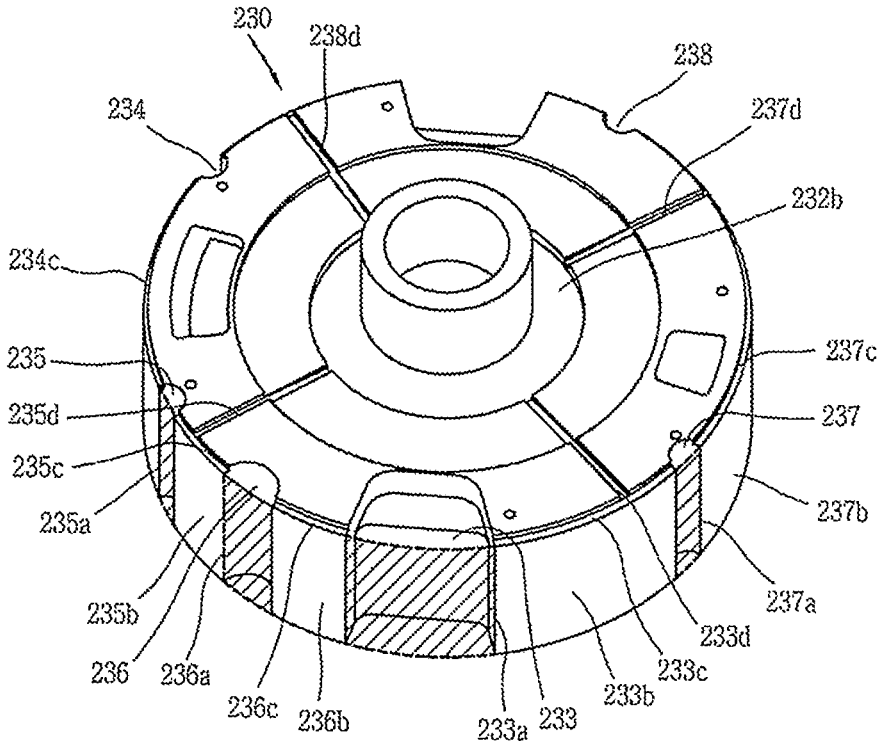
FIG. 8 is a perspective view of a main frame according to another embodiment.

FIG. 8 is a perspective view of a main frame according to another embodiment. Referring to FIG. 8, a plurality of second passage grooves 233d, 235d, 237d, 238d may be further formed on the main frame 230 in addition to the oil discharge paths 233, 234, 235, 236, 237, 238 and first passage grooves 233c, 234c, 235c, 236c, 237c. Each second passage groove 233d, 235d, 237d, 238d may be a groove to allow oil accumulated adjacent to a center of an upper surface of the main frame 230 to flow to the respective first passage groove 233c, 234c, 235c, 236c, 237c.

The second passage groove 233d, 235d, 237d, 238d may be formed to extend from the respective first passage groove 233c, 234c, 235c, 236c, 237c at an upper portion of the end plate of the main frame 230 in a central direction along an upper surface of the main frame 230. For example, the second passage groove 233d, 235d, 237d, 238d may be formed to extend from the respective first passage groove 233c, 234c, 235c, 236c, 237c of the main frame 230 to the oil pocket 232b or from the respective first passage groove 233c, 234c, 235c, 236c, 237c to an adjoining outer circumferential surface of the first shaft receiving portion 232a.

The second passage groove 233d, 235d, 237d, 238d may be formed in various shapes, such as being rounded at each edge, including a smooth curved surface or inclined surface therein, changing a width of the groove, for example, to efficiently flow oil. Further, each second passage groove 233d, 235d, 237d, 238d may be formed to be directly connected to the respective oil discharge path 233, 234, 235, 236, 237, 238 regardless of a formation of the first passage groove 233c, 234c, 235c, 236c, 237c.

The configurations and methods according to the described embodiments will not be limited to the disclosed compressor, and all or parts of each embodiment may be selectively combined and configured to make various modifications thereto.

Embodiments disclosed herein provide a scroll compressor that efficiently performs recovery of remaining oil accumulated on an upper surface of a compression device after lubricating the compression device and oil separated from compressed refrigerant, as well as securing a sufficient fixed area of the main frame.

Embodiments disclosed herein provide a scroll compressor that may include a casing; an electric motor drive having a stator fixed within the casing, and a rotor rotatably provided within the stator; a rotational shaft coupled to the rotor to rotate along with the rotor; a compression unit or device disposed at a lower portion of the electric motor drive to receive a rotational force from the rotational shaft and compress a refrigerant; and an oil storage space located within the casing. A plurality of oil discharge paths to allow oil accumulated at an upper portion of the compression unit to be discharged to the oil storage space may be formed on an outer circumferential surface of the compression unit to be separated from each other, and an overall cross sectional area of the plurality of oil discharge paths may be about 2 to about 12% of an inner diameter cross-sectional area of the casing brought into contact with or separated from an outer circumferential surface of the compression unit in the compression unit.

The compression unit may include a main frame configured to form an upper portion of the compression unit, and fixed within the casing; a fixed scroll coupled to the main frame to form an internal space between the main frame and the fixed scroll, and provided with a fixed wrap; and an orbiting scroll provided to surround the rotational shaft in the internal space between the main frame and the fixed scroll, and provided with an orbiting wrap teeth-combined or coupled with the fixed wrap to form a compression chamber to move in engagement with the fixed scroll by the rotation of the rotational shaft. The plurality of oil discharge paths may be formed on an outer circumferential surface of the main frame to be separated from each other by a predetermined distance.

The main frame may include a first passage groove portion or groove that extends along an upper edge of the outer circumferential surface to connect between the plurality of oil discharge paths. The main frame may further include a second passage groove portion or groove that extends from a central portion of the main frame to the first passage groove portion.

The plurality of oil discharge paths may be formed within a region offset by about 11 to about 13% of the compression unit cross-sectional area in a central direction from the outer circumferential surface of the compression unit.

Embodiments disclosed herein further provide a scroll compressor that may include a casing; an electric motor drive provided within the casing to generate a rotational force; a compression unit or device including a main frame disposed at a lower portion of the electric motor drive, and mounted on an inner side wall of the casing, a fixed scroll coupled to the main frame at a lower portion of the main frame, and an orbiting scroll configured to form a compression chamber between the fixed scroll and the main frame so as to move in engagement with the fixed scroll; and an oil storage space located within the casing. The main frame may include a plurality of oil discharge paths recessed on an outer circumferential surface thereof and extended from an upper portion to a lower portion thereof, and disposed to be separated from each other along a circumference to discharge oil accumulated at an upper portion of the main frame to the oil storage space; and a plurality of mounting portions formed between the plurality of oil discharge paths, and coupled to an inner side wall of the casing, and any one cross-sectional area of the plurality of mounting portions may be larger than any one cross-sectional area of the plurality of oil discharge paths formed at both sides thereof.

Embodiments disclosed herein further provide a scroll compressor that may include a casing; an electric motor drive having a stator fixed within the casing, and a rotor rotatably provided within the stator; a rotational shaft coupled to the rotor to rotate along with the rotor; a compression unit or device disposed at a lower portion of the electric motor drive to receive a rotational force from the rotational shaft and compress a refrigerant; and an oil storage space located within the casing. The compression unit may include a plurality of oil discharge paths recessed on an outer circumferential surface thereof and extended from an upper portion to a lower portion thereof, and disposed to be separated from each other along a circumference to discharge oil accumulated at the upper portion to the oil storage space, and a first passage groove portion or groove that extends along an upper edge of the outer circumferential surface to connect between the plurality of oil discharge paths. The compression unit may further include a second passage groove portion or groove that extends from a central portion of the main frame to the first passage groove portion. The second passage groove portion may be formed to be inclined toward the first passage groove portion at a central portion of the main frame.

The compression unit may include a main frame configured to form an upper portion of the compression unit, and fixed within the casing; a fixed scroll coupled to the main frame to form an internal space between the main frame and the fixed scroll, and provided with a fixed wrap; and an orbiting scroll provided to surround the rotating shaft in the internal space between the main frame and the fixed scroll, and provided with an orbiting wrap teeth-combined or coupled with the fixed wrap to form a compression chamber to move in engagement with the fixed scroll by the rotation of the rotational shaft. The plurality of oil discharge paths, the first passage groove portion, and the second passage groove portion may be formed on the main frame.

A compressor according to an embodiment may form an oil discharge path on a main frame, and thus, efficiently perform recovery of remaining oil accumulated on an upper surface of a compression unit or device after lubricating the compression unit and oil separated from refrigerant, thereby preventing shortage of oil in the compressor in advance. Further, an oil discharge path formed on the main frame may be formed such that any one cross-sectional area of a plurality of mounting portions may be larger than any one cross-sectional area of the plurality of oil discharge paths formed at both sides thereof, thereby allowing the main frame to be supported at an inner portion of the casing without being released.

Moreover, the detailed description of embodiments may be a specific example allowing an ordinary person skilled in the art to implement the embodiments, and the right of the applicant may not be necessarily limited to this. The right of the applicant should be determined in accordance with the appended claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A scroll compressor, comprising:

a casing;

an electric motor drive having a stator fixed within the casing, and a rotor rotatably provided within the stator;

a rotational shaft coupled to the rotor to rotate along with the rotor;

a compression device disposed at a lower portion of the electric motor drive to receive a rotational force from the rotational shaft and compress a refrigerant;

an oil storage space located at a lower side of the compression device within the casing; [and]

a first space and a second space located at an upper side of the compression device within the casing, wherein the refrigerant compressed in the compression device is discharged into the first space and the second space[,]; *and*

*a plurality of oil discharge paths formed on an outer circumferential surface of the compression device to be separated from each other,* wherein [a] *the* plurality of oil discharge paths[,] *is provided* to allow oil separated from the refrigerant in the second space and accumulated at an upper portion [thereof] *of the compression device* to be discharged to the oil storage space, [is formed on an outer circumferential surface of the compression device to be separated from each other, and wherein an overall cross-sectional area of the plurality of oil discharge paths is 2 to 12% of an inner diameter cross-sectional area of the casing brought into contact with or separated from an outer circumferential surface of the compression device] *wherein the first space is defined as a space between the casing and the electric motor drive, wherein the second space is defined as a space between the compression device and the electric motor drive, and wherein an overall cross-sectional area of the plurality of oil discharge paths is 2 to 12% of an inner diameter cross-sectional area of the casing brought into contact with or separated from the outer circumferential surface of the compression device.*

2. The scroll compressor of claim 1, wherein the compression device comprises:

a main frame configured to form [an] *the* upper portion of the compression device, and fixed within the casing;

a fixed scroll coupled to the main frame to form an internal space between the main frame and the fixed scroll, and provided with a fixed wrap; and an orbiting scroll provided to surround the rotational shaft in the internal space between the main frame and the fixed scroll, and provided with an orbiting wrap coupled with the fixed wrap to form a plurality of compression chambers as the orbiting scroll moves in engagement with the fixed scroll by the rotation of the rotational shaft, and wherein the plurality of oil discharge paths is formed on an outer circumferential surface of the main frame and separated from each other by a predetermined distance.

3. The scroll compressor of claim 2, wherein the main frame comprises a plurality of first passage grooves that extends along an upper edge of the outer circumferential surface of the main frame and connects the plurality of oil discharge paths, respectively.

4. The scroll compressor of claim 3, wherein each of the plurality of first passage grooves is at least one of rounded at each edge, includes a smooth curved surface or inclined surface, or includes a width that varies along the respective first passage groove.

5. The scroll compressor of claim 3, wherein the main frame further comprises a plurality of second passage grooves that extends from a central portion of the main frame to the plurality of first passage grooves, respectively.

6. The scroll compressor of claim 5, wherein each of the plurality of second passage grooves is at least one of rounded at each edge, includes a smooth curved surface or inclined surface, or includes a width that varies along the respective second passage groove.

7. The scroll compressor of claim 2, wherein each of the plurality of oil discharge paths is formed in a hole shape adjacent to an upper outer circumferential surface of the main frame or is recessed in a semi-circular shape on the outer circumferential surface of the main frame.

8. The scroll compressor of claim 1, wherein the plurality of oil discharge paths is formed within a region between the outer circumferential surface of the compression device and a surface concentric to the outer circumferential surface of the compression device, and wherein the surface is offset by 11 to 13% of a compression device cross-sectional area in a central direction from the outer circumferential surface of the compression device.

9. The scroll compressor of claim 2, wherein the compression device includes a discharge cover fixed at a bottom surface of the fixed scroll, which defines a third space formed with the bottom surface of the fixed scroll.

10. The scroll compressor of claim 9, wherein the fixed scroll includes a discharge port through which the compressed refrigerant in the plurality of compression chambers is discharged into the third space.

11. The scroll compressor of claim 10, wherein the main frame includes a first discharge hole that communicates with the second space, wherein the fixed scroll includes a second discharge hole that communicates the third space, and wherein an inlet of the first discharge hole communicates with an outlet of the second discharge hole, such that the third space communicates with the second space and the compressed refrigerant is guided from the third space to the second space through the first discharge hold and the second discharge hole.

12. The scroll compressor of claim 9, wherein the discharge cover partitions the third space from the oil storage space.

13. A scroll compressor, comprising:

a casing;

an electric motor drive provided within the casing to generate a rotational force;

a compression device comprising a main frame disposed at a lower portion of the electric motor drive, and mounted on an inner side wall of the casing, a fixed scroll coupled to the main frame at a lower portion of the main frame, and an orbiting scroll configured to form with the fixed scroll a plurality of compression chambers provided between the fixed scroll and the main frame so as to move in engagement with the fixed scroll;

an oil storage space located at a lower side of the compression device within the casing; *and* a first space and a second space located at an upper side of the compression device within the casing, wherein the refrigerant compressed in the compression device is discharged into the first space and the second space, and wherein the main frame comprises:

a plurality of oil discharge paths recessed on an outer circumferential surface of the main frame, that extends from an upper portion communicating with the second space to a lower portion communicating with the oil storage space thereof, and disposed to be separated from each other along a circumference of the main frame to discharge oil accumulated at an upper portion of the main frame to the oil storage space; and a plurality of mounting portions [formed] *provided on an outer circumferential surface of the main frame and provided* between the plurality of oil discharge paths, and coupled to the inner side wall of the casing, wherein [any one cross-sectional area of the plurality of mounting portions is larger than any one cross-sectional area of the plurality of oil discharge paths formed at both sides thereof] *the first space is defined as a space between the casing and the electric motor drive, wherein the second space is defined as a space between the compression device and the electric motor drive, wherein an overall cross-sectional area of the plurality of oil discharge paths is 2 to 12% of an inner diameter cross-sectional area of the casing brought into contact with or separated from the outer circumferential surface of the compression device*.

14. The scroll compressor of claim 13, wherein the main frame comprises a plurality of first passage grooves that extends along an upper edge of the outer circumferential surface of the main frame and connects the plurality of oil discharge paths, respectively.

15. The scroll compressor of claim 14, wherein each of the plurality of first passage grooves is at least one of rounded at each edge, includes a smooth curved surface or inclined surface, or includes a width that varies along the respective first passage groove.

16. The scroll compressor of claim 14, wherein the main frame further comprises a plurality of second passage grooves that extends from a central portion of the main frame to the plurality of first passage grooves, respectively.

17. The scroll compressor of claim 16, wherein each of the plurality of second passage grooves is at least one of rounded at each edge, includes a smooth curved surface or inclined surface, or includes a width that varies along the respective second passage groove.

18. The scroll compressor of claim 13, wherein each of the plurality of oil discharge paths is formed in a hole shape adjacent to an upper outer circumferential surface of the main frame or is recessed in a semi-circular shape on the outer circumferential surface of the main frame.

19. The scroll compressor of claim 13, wherein the plurality of oil discharge paths is formed within a region between the outer circumferential surface of the compression device and a surface concentric to the outer circumferential surface of the compression device, and wherein the surface is offset by 11 to 13% of a compression device cross-sectional area in a central direction from the outer circumferential surface of the compression device.

* * * * *